(12) United States Patent
Mizutani et al.

(10) Patent No.: US 9,920,409 B2
(45) Date of Patent: Mar. 20, 2018

(54) FERRITIC STAINLESS STEEL FOIL

(71) Applicant: JFE STEEL CORPORATION, Chiyoda-ku, Tokyo (JP)

(72) Inventors: Akito Mizutani, Chiba (JP); Mitsuyuki Fujisawa, Chiba (JP); Hiroki Ota, Handa (JP); Hiroyuki Ogata, Chiba (JP)

(73) Assignee: JFE Steel Corporation, Tokyo (JP)

( * ) Notice: Subject to any disclaimer, the term of this patent is extended or adjusted under 35 U.S.C. 154(b) by 52 days.

(21) Appl. No.: 14/375,044

(22) PCT Filed: Jan. 24, 2013

(86) PCT No.: PCT/JP2013/000355
§ 371 (c)(1),
(2) Date: Jul. 28, 2014

(87) PCT Pub. No.: WO2013/114833
PCT Pub. Date: Aug. 8, 2013

(65) Prior Publication Data
US 2015/0010771 A1  Jan. 8, 2015

(30) Foreign Application Priority Data
Jan. 30, 2012  (JP) .................. 2012-016212

(51) Int. Cl.
*C22C 38/42* (2006.01)
*C22C 38/44* (2006.01)
(Continued)

(52) U.S. Cl.
CPC ............. *C22C 38/50* (2013.01); *C21D 6/002* (2013.01); *C22C 38/001* (2013.01);
(Continued)

(58) Field of Classification Search
None
See application file for complete search history.

(56) References Cited

U.S. PATENT DOCUMENTS

| 6,086,689 A | 7/2000 | Sassoulas |
| 2012/0020827 A1 | 1/2012 | Nakamura |

FOREIGN PATENT DOCUMENTS

| EP | 0478790 A1 * | 4/1992 | ............. C22C 38/48 |
| EP | 1918399 | 5/2008 | |

(Continued)

OTHER PUBLICATIONS

W. Ed Wegst, "Some Facts About Alloying and Accompanying Elements in Steel", Wegst CW=Stahlschlussel Stahlschiessel. Nachschiagewerk, Marbach, Verlag Stahischiussel Wegst, DE, vol., Edition 1989, p. 8.*

(Continued)

Primary Examiner — Deborah Yee
(74) Attorney, Agent, or Firm — RatnerPrestia

(57) ABSTRACT

Provided is stainless steel foil that is suitably used for forming a catalyst carrier for an exhaust gas purifying facility, the catalyst carrier being installed in a vehicle that discharges exhaust gas having a temperature lower than the temperature of exhaust gas of a gasoline-powered automobile. The ferritic stainless steel foil contains, by mass %, C: 0.05% or less, Si: 2.0% or less, Mn: 1.0% or less, S: 0.005% or less, P: 0.05% or less, Cr: 11.0% to 25.0%, Ni: 0.05% to 0.30%, Al: 0.01% to 1.5%, Cu: 0.01% to 2.0%, N: 0.10% or less, and the balance being Fe and inevitable impurities.

16 Claims, 1 Drawing Sheet

(51) Int. Cl.
- *C22C 38/48* (2006.01)
- *C22C 38/50* (2006.01)
- *C22C 38/06* (2006.01)
- *F01N 3/28* (2006.01)
- *C22C 38/00* (2006.01)
- *C22C 38/02* (2006.01)
- *C22C 38/04* (2006.01)
- *C21D 6/00* (2006.01)
- *C22C 38/26* (2006.01)
- *C21D 8/02* (2006.01)

(52) U.S. Cl.
CPC .......... *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/26* (2013.01); *C22C 38/42* (2013.01); *C22C 38/44* (2013.01); *C22C 38/48* (2013.01); *F01N 3/281* (2013.01); *C21D 8/0226* (2013.01); *C21D 8/0236* (2013.01); *C21D 8/0268* (2013.01); *F01N 2330/02* (2013.01); *F01N 2530/04* (2013.01); *Y10T 428/12431* (2015.01)

(56) References Cited

FOREIGN PATENT DOCUMENTS

| | | |
|---|---|---|
| EP | 2100983 | 9/2009 |
| JP | H 07-213918 A | 8/1995 |
| JP | H 07-275715 A | 10/1995 |
| JP | H0791584 | 10/1995 |
| JP | H08260107 | 10/1996 |
| JP | 10-251750 A | 9/1998 |
| JP | 3276303 | 4/2002 |
| JP | 2002194504 A | 7/2002 |
| JP | 2004-307918 A | 11/2004 |
| TW | 201109446 | 3/2011 |

OTHER PUBLICATIONS

European Search Report dated Mar. 11, 2015 for European Application No. 13743347.0.
International Search Report dated Apr. 9, 2013, application No. PCT/JP2013/000355.
Chinese Office Action for Chinese Application No. 201380007345.3, dated Apr. 18, 2016 with Concise Statement of Relevance of Office Action, 13 pages.
Korean Office Action for Korean Application No. 10-2014-7021635, dated Jun. 16, 2016, including Concise Statement of Relevance of Office Action, 4 pages.
European Office Action for European Application No. 13743347.0, dated Aug. 1, 2016, 4 pages.
Korean Final Rejection for Korean Application No. 10-2014-7021635, dated Mar. 13, 2017, with Concise Statement of Relevance of Office Action—4 Pages.
Chinese Office Action for Chinese Application No. 201380007345.3, dated Nov. 21, 2016, including Concise Statement of Relevance of Search Report, 9 pages.

* cited by examiner

FERRITIC STAINLESS STEEL FOIL

CROSS REFERENCE TO RELATED APPLICATIONS

This is the U.S. National Phase application of PCT/JP2013/000355, filed Jan. 24, 2013, which claims priority to Japanese Patent Application No. 2012-016212, filed Jan. 30, 2012, the disclosures of each of these applications being incorporated herein by reference in their entireties for all purposes.

FIELD OF THE INVENTION

The present invention relates to ferritic stainless steel foil having high resistance to shape change, high resistance to peeling of a coating layer, and good manufacturability.

BACKGROUND OF THE INVENTION

Recently, regulations concerning automotive exhaust gas have been tightened, and accordingly there has been an increase in the number of cases where a metal honeycomb made of stainless steel foil serving as a catalyst carrier for an automotive exhaust gas purifying facility is installed in an automobile. A metal honeycomb is capable of realizing a larger aperture ratio and has higher thermal shock resistance and higher vibration resistance than a ceramic honeycomb carrier. Therefore, the proportion of cases where a metal honeycomb is employed has increased. In particular, when exhaust gas purifying facility is installed in a large automobile such as a truck, the shape of the carrier accordingly becomes large and therefore a metal honeycomb is commonly employed due to its flexibility of shape.

A metal honeycomb has a honeycomb structure formed by, for example, stacking a flat stainless steel foil (flat foil) and a stainless steel foil that has been worked into a corrugated shape (corrugated foil) alternately. A catalytic material is applied to the surfaces of the stacked stainless steel foils, and the resulting metal honeycomb is used for an automotive exhaust gas purifying facility. FIG. 1 shows an example of a metal honeycomb; a metal honeycomb 4 is prepared by stacking a flat foil 1 and a corrugated foil 2, winding the resulting product into a roll shape, and fixing the periphery of the wound product in place with an external cylinder 3.

Addition of more than about 3 mass % of Al to stainless steel causes an $Al_2O_3$ oxide layer to be formed on the surface of the stainless steel, which markedly improves oxidation resistance. Therefore, high-Al content ferritic stainless steel foil, typified by 20 mass % Cr-5 mass % Al stainless steel foil or 18 mass % Cr-3 mass % Al stainless steel foil, has been mainly used as stainless steel foil used for forming metal honeycombs.

In a gasoline-powered automobile, the temperature inside its automotive exhaust gas purifying facility is increased due to the temperature of exhaust gas and a catalytic reaction and may reach a high temperature of 1000° C. or more. Thus, high-Al content ferritic stainless steel foil having considerably high oxidation resistance at high temperatures is used as a catalyst carrier. A catalyst carrier requires, in addition to oxidation resistance, resistance to shape change even when repeatedly exposed to a high temperature, resistance to peeling of an oxide layer that occurs during cooling of the catalyst carrier, and high adhesion to wash coat. High-Al content ferritic stainless steel foil is good in terms of these properties and thus has been widely used.

On the other hand, the temperature of exhaust gas of a diesel-powered automobile does not raise as high as the temperature of exhaust gas of a gasoline-powered automobile, and the temperature reached is generally about 800° C. The highest temperature reached by exhaust gas of a vehicle other than automobiles, such as agricultural machinery or building machinery, is even lower. Therefore, when the above-described 20 mass % Cr-5 mass % Al stainless steel foil or 18 mass % Cr-3 mass % Al stainless steel foil is applied to a vehicle that discharges exhaust gas having a low temperature, such as a diesel-powered automobile, in most cases, high oxidation resistance becomes redundant. In addition, while the above-described high-Al content ferritic stainless steel foil has high oxidation resistance, the manufacturability of the foil is poor and consequently its production cost is increased. Generally, addition of Al to ferritic stainless steel tends to significantly reduce the toughness of the ferritic stainless steel. This often results in rupturing of a steel sheet during cooling of a cast slab, during expansion of a hot-rolled coil, or during cold rolling, which causes equipment trouble and a reduction in yield.

In order to address the above-described problems, stainless steel foil whose manufacturability is improved by reducing the Al content in the stainless steel foil as much as possible has been proposed. For example, Patent Literature 1 discloses a metal honeycomb made of stainless steel foil produced by limiting the Al content to be within the range from a level of impurities to 0.8 mass % and generating a Cr oxide layer at a high temperature but not an Al oxide layer in order to improve diffusion bondability for forming a carrier.

Patent Literature 2 discloses a metal honeycomb made of stainless steel foil produced by limiting the Al content in the stainless steel foil to be within the range from a level of impurities to 0.8 mass % and setting the Mo content to 0.3 mass % to 3 mass % in order to improve oxidation resistance, diffusion bondability, and resistance to corrosion by sulfuric acid.

Patent Literature 3 discloses stainless steel produced using 18 mass % Cr-3 mass % Al steel as a base material by reducing the Al content in the steel to be less than 1.5 mass % to 2.5 mass % and limiting the crystal grain size in order to realize both good workability and high oxidation resistance.

PATENT LITERATURE

[PTL 1] Japanese Unexamined Patent Application Publication No. 7-213918
[PTL 2] Japanese Unexamined Patent Application Publication No. 7-275715
[PTL 3] Japanese Unexamined Patent Application Publication No. 2004-307918

SUMMARY OF THE INVENTION

In the stainless steel foils described in Patent Literatures 1 and 2, a difference in thermal expansion rate between a Cr oxide layer generated on the surface of the foil and base iron becomes greater than a difference in thermal expansion rate between an Al oxide layer and base iron. Therefore, creep deformation may occur at a high temperature, which may result in a change in the shape of the foil and peeling of the oxide layer from the surface of the foil. If the above-described deformation or peeling occurs, a catalyst supported on the surface of the foil drops off and consequently the characteristics required by a catalyst carrier are not satisfied.

According to the method described in Patent Literature 3, in the case where the stainless steel is used in the form of a foil, when Al is depleted and generation of a Cr layer begins during high-temperature oxidation, shape change also occurs due to stress resulting from a difference in thermal expansion rate against the coating layer because the proof stress of the base metal is not sufficiently high. As described above, stainless steel foil containing a reduced amount of Al in order to improve manufacturability has big problems of shape change and peeling of the oxide layer at high temperatures due to a difference in thermal expansion rate between an oxide layer and base iron.

The present invention aims to provide, in order to address these problems, ferritic stainless steel foil used for forming a catalyst carrier for an automotive exhaust gas purifying facility to be installed in a vehicle that discharges exhaust gas having a temperature lower than the temperature of exhaust gas of a gasoline-powered automobile. The stainless steel foil has enhanced resistance to shape change, enhanced resistance to peeling of a coating layer, and good manufacturability.

The inventors of the present invention have conducted extensive studies in order to address the above-described problems and, as a result, have found a method for improving, in the case where the temperature of automotive exhaust gas is lower than the temperature of exhaust gas of a gasoline-powered automobile, resistance to shape change and resistance to peeling of a coating layer that are produced by a foil material while a required oxidation resistance is maintained even when the foil material is made of low-Al content steel.

Further studies have been conducted on the basis of the above-described findings, and the present invention has been made. The summary of aspects of the present invention is as follows.

[1] Ferritic stainless steel foil containing, by mass %, C: 0.05% or less, Si: 2.0% or less, Mn: 1.0% or less, S: 0.005% or less, P: 0.05% or less, C: 11.0% to 25.0%, Ni: 0.05% to 0.30%, Al: 0.01% to 1.5%, Cu: 0.01% to 2.0%, N: 0.10% or less, and the balance being Fe and inevitable impurities.

[2] The ferritic stainless steel foil described in [1] further containing, by mass %, one or more elements selected from Nb: 0.01% to 1.0%, Mo: 0.01% to 3.0%, and W: 0.01% to 3.0%, the content of the one or more elements being 0.01% to 3.0% in total.

[3] The ferritic stainless steel foil described in [1] or [2] further containing, by mass %, REM: 0.01% to 0.20%.

[4] The ferritic stainless steel foil described in any one of [1] to [3] further containing, by mass %, one or more elements selected from Ti: 0.01% to 1.0%, Zr: 0.01% to 0.20%, Hf: 0.01% to 0.20%, Ca: 0.0010% to 0.0300%, and Mg: 0.0015% to 0.0300%.

[5] The ferritic stainless steel foil described in any one of [1] to [4] having a thickness of 100 µm or less.

According to the present invention, stainless steel foil used for forming a catalyst carrier for an exhaust gas purifying facility can be produced. The stainless steel foil has high resistance to shape change, high resistance to peeling of a coating layer, and good manufacturability. The stainless steel foil produced in the present invention may be suitably used for forming a catalyst carrier for an exhaust gas purifying facility to be installed in "off-road diesel-powered automobiles" such as agricultural machinery including a tractor and a combine-harvester and construction equipment including a bulldozer and an excavator and for forming a catalyst carrier for industrial exhaust gas purifying facility. The stainless steel foil produced in the present invention may also be used for forming a catalyst carrier for diesel-powered automobiles, gasoline-powered automobiles, or two-wheel vehicles, for forming an external cylinder member of these catalyst carriers, a member for exhausting gas of automobiles or two-wheel vehicles, or a member of an exhaust pipe for heating appliance or combustion appliance.

However, the applications of the stainless steel foil produced in the present invention are not limited to the above-described applications.

DETAILED DESCRIPTION OF EMBODIMENTS OF THE INVENTION

Figure 1:
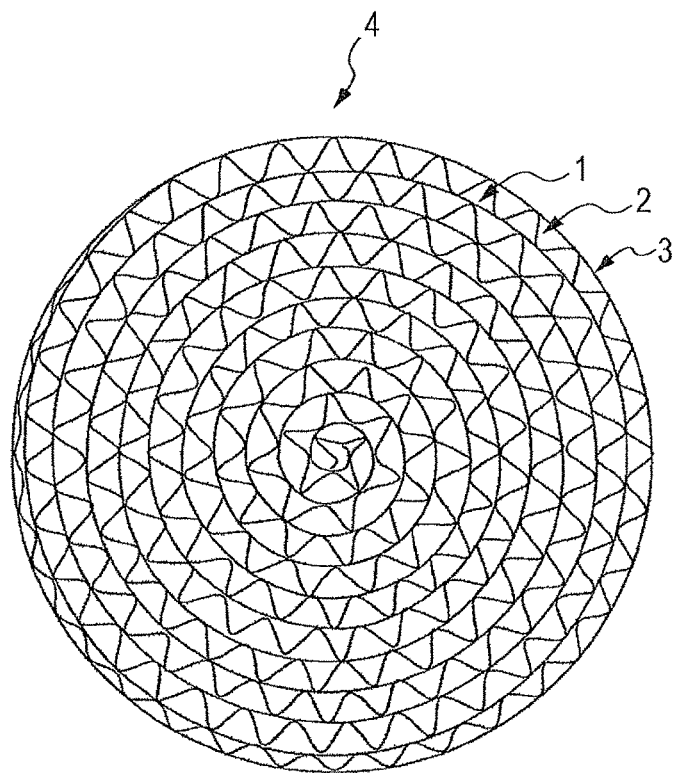
FIG. 1 is a diagram illustrating an example of a metal honeycomb.

The inventors of the present invention have conducted detailed studies on ferritic stainless steel foil on which an $Al_2O_3$ oxide is not generated in terms of resistance to shape change and resistance to peeling of a coating layer at high temperatures, and manufacturability. As a result, the inventors have obtained the following findings. Thus, the present invention has been made. The term "stainless steel foil" used herein generally refers to stainless steel having a thickness of 100 µm or less but is not particularly limited to this.

(A) Increasing the high-temperature strength of foil helps to reduce shape change caused by high-temperature oxidation. This is because an increase in the strength of the foil lessens deformation due to stress caused by a difference in thermal expansion rate between an oxide layer and base iron.

(B) It was found that some of the causes of peeling of an oxide layer are cracks that occur upon a change in the shape of the foil due to a high temperature and voids that occur at the interface between a coating layer and base iron. Occurrence of such cracks or voids results in the formation of a new surface having a poor protective property, and this portion is subjected to severe oxidation, which leads to occurrence of peeling. Formation of such cracks and voids can be suppressed by increasing high-temperature strength and thereby reducing shape change. As is commonly known, addition of a REM also enhances resistance to peeling of a coating layer.

(C) Precipitation strengthening due to addition of Cu helps to improve high-temperature strength. In order to achieve further strengthening, strengthening due to addition of a solute strengthening elements, such as Nb, Mo, or W, may be employed in combination. It is preferable to use Cu, which is a relatively inexpensive element. However, Cu reduces oxidation resistance at high temperatures. Accordingly, the inventors of the present invention have found that, when Al is added together with a strengthening element in an adequate amount that does not affect manufacturability, the required oxidation resistance can be maintained even when a strengthening element is added. Thus, the present invention has been made.

Embodiments of the present invention are described in detail below.

1. Composition

The composition according to embodiments of the present invention is described below. Note that, when referring to a composition, "%" always denotes "mass %".

C: 0.05% or Less

The C content exceeding 0.05% reduces strength at high temperatures and also deteriorates oxidation resistance. In addition, toughness is degraded, which leads to degradation of manufacturability. Thus, the C content is set to 0.05% or less, preferably set to 0.02% or less, and more preferably set to 0.01% or less. It is preferable to reduce the C content as much as possible.

Si: 2.0% or Less

Si is an element that improves oxidation resistance. However, the Si content exceeding 2.0% deteriorates toughness and workability, which causes difficulty in manufacture of the foil. Thus, the Si content is set to 2.0% or less, preferably set to 1.0% or less, and more preferably set to 0.5% or less. In order to further enhance oxidation resistance, the Si content is preferably set to 0.05% or more and more preferably set to 0.1% or more.

Mn: 1.0% or Less

The Mn content exceeding 1.0% deteriorates oxidation resistance at high temperatures. Thus, the Mn content is set to 1.0% or less and preferably set to 0.5% or less. However, since Mn has an effect of stabilizing S contained in steel, the Mn content is preferably set to 0.01% or more and more preferably set to 0.05% or more.

S: 0.005% or Less

The S content exceeding 0.005% deteriorates the adhesion of a coating layer to a catalyst carrier and oxidation resistance at high temperatures. Thus, the S content is set to 0.005% or less, preferably set to 0.003% or less, and more preferably set to 0.001% or less. It is more preferable to reduce the S content as much as possible.

P: 0.05% or Less

The P content exceeding 0.05% deteriorates the adhesion of an oxide layer to a catalyst carrier and oxidation resistance at high temperatures. Thus, the P content is set to 0.05% or less and preferably set to 0.03% or less. It is more preferable to reduce the P content as much as possible.

Cr: 11.0% to 25.0%

Cr is an element that is essential for maintaining oxidation resistance and strength at high temperatures. Thus, the Cr content is set to 11.0% or more. However, the Cr content exceeding 25.0% deteriorates workability and, as a result, good manufacturability, which is an object of the present invention, fails to be achieved. Thus, the Cr content is set to 11.0% to 25.0% and preferably set to 13.0% to 20.0%. The Cr content is more preferably set to 15.0% to 18.0% with consideration of balance between the production cost and oxidation resistance.

Ni: 0.05% to 0.30%

Ni has an effect of enhancing brazeability for forming a catalyst carrier. Thus, the Ni content is set to 0.05% or more. However, if the content of Ni, which is an austenite stabilization element, exceeds 0.30%, upon beginning of oxidation of Cr, austenite is generated and this increases the thermal expansion coefficient of the foil, which causes problems such as wrinkles of the foil or rupturing of the foil (cell breakage). Thus, the Ni content is set to 0.05% to 0.30% and preferably set to 0.08% to 0.20%.

Al: 0.01% to 1.5%

Al is an element that improves the oxidation resistance of the ferritic stainless steel at high temperatures. Thus, the Al content is set to 0.01% or more. However, the Al content exceeding 1.5% deteriorates the toughness of a slab and the toughness of a hot-rolled sheet, which results in degradation of manufacturability. Thus, the Al content is set to 0.01% to 1.5%, preferably set to 0.05% to 1.0%, and more preferably set to 0.1% to 1.0%. The Al content is further preferably set to 0.2% to 0.8% with consideration of balance between manufacturability and oxidation resistance.

Cu: 0.01% to 2.0%

Addition of Cu results in formation of fine precipitates, which increases the strength of the foil. This produces an effect of suppressing creep deformation that is caused by a difference in thermal expansion between an oxide layer and base iron. Thus, the Cu content is set to 0.01% or more. Cu is also an element that is effective for enhancing corrosion resistance and improving salt corrosion resistance. However, the Cu content exceeding 2.0% deteriorates oxidation resistance, it reduces manufacturability of the foil, which leads to an increase in cost. Thus, the Cu content is set to 0.01% to 2.0%. The Cu content is preferably set to 0.05% to 1.5% with consideration of resistance to shape change and cost reduction. When there is a need for high-temperature strength, the Cu content is more preferably set to 0.2% to 1.5%.

N: 0.10% or Less

The N content exceeding 0.10% deteriorates toughness and workability, which causes difficulty in manufacture of the foil. Thus, the N content is set to 0.10% or less, preferably set to 0.05% or less, and more preferably set to 0.01% or less.

The basic composition according to embodiments of the present invention is as described above. In addition, the ferritic stainless steel foil may further include one or more elements selected from Nb, Mo, and W as optional elements with consideration of strength at high temperatures and workability.

One or more elements selected from Nb: 0.01% to 1.0%, Mo: 0.01% to 3.0%, and W: 0.01% to 3.0%: 0.01% to 3.0% in total Nb increases the strength of the foil at high temperatures and improves resistance to shape change and resistance to peeling of a coating layer. These effects are obtained when the Nb content is 0.01% or more. However, the Nb content exceeding 1.0% deteriorates workability, which causes difficulty in manufacture of the foil. Thus, when the foil includes Nb, the Nb content is preferably set to 0.01% to 1.0% and more preferably set to 0.1% to 0.7%. The Nb content is further preferably set to 0.3% to 0.6% with consideration of balance between strength at high temperatures and manufacturability.

Both Mo and W increase strength at high temperatures and thereby improve the service life of a catalyst carrier. Therefore, the ferritic stainless steel foil may contain Mo and W as optional elements. Furthermore, these elements cause an oxide layer to be stabilized and enhance salt corrosion resistance. These effects can be obtained when the Mo content or the W content is 0.01% or more respectively. However, if the Mo content or the W content exceeds 3.0% respectively, workability is degraded, which causes difficulty in manufacture of the foil. Thus, when the ferritic stainless steel foil contains Mo or W, the Mo content or the W content is preferably set to 0.01% to 3.0% respectively and more preferably set to 1.5% to 2.5% respectively.

When the ferritic stainless steel foil contains two or more elements selected from Nb, Mo, and W, the content of the two or more elements is preferably set to 0.01% to 3.0% in total. This is because the desired effect fails to be obtained if the content of the two or more elements is less than 0.01% in total and workability is significantly degraded if the content of the two or more elements exceeds 3.0% in total. The content of the two or more elements is more preferably set to 1.5% to 2.5% in total.

The ferritic stainless steel foil may contain a REM in order to improve the properties of an oxide layer.

REM: 0.01% to 0.20%

REMs are Sc, Y, and lanthanide elements (elements having atomic numbers 57 to 71, such as La, Ce, Pr, Nd, and Sm). The REM content herein refers to the total content of these elements. Generally, a REM improves the adhesion of an oxide layer and therefore has a remarkable effect of enhancing the peel resistance of a coating layer. These effects can be obtained when the REM content is 0.01% or more. However, if the REM content exceeds 0.20%, these elements concentrate and precipitate at crystal grain boundaries. The resulting precipitates are molten when being heated to a high temperature, which causes surface defects of a hot-rolled sheet. Thus, when the ferritic stainless steel foil contains a REM, the REM content is preferably set to 0.01% to 0.20% and more preferably set to 0.03% to 0.10%.

The ferritic stainless steel foil may contain one or more elements selected from Ti, Zr, Hf, Ca, and Mg in order to enhance oxidation resistance.

Ti: 0.01% to 1.0%

Ti is an element that stabilizes C and N contained in steel and thereby enhances the workability and the corrosion resistance of the steel. This effect can be obtained when the Ti content is 0.01% or more. However, since Ti is an element that is easily oxidized, if the Ti content exceeds 1.0%, a large amount of a Ti oxide is mixed into a coating layer, which significantly deteriorates brazeability and oxidation resistance at high temperatures. Thus, when the ferritic stainless steel foil contains Ti, the Ti content is preferably set to 0.01% to 1.0% and more preferably set to 0.05% to 0.20%.

Zr: 0.01% to 0.20%

Zr stabilizes with C and N contained in steel and thereby improves the creep characteristics of the steel. This also enhances toughness and workability, which facilitates manufacture of the foil. Zr concentrates at grain boundaries in an oxide layer, which enhances oxidation resistance at high temperatures, strength at high temperatures, and, in particular, resistance to shape change. These effects can be obtained when the Zr content is 0.01% or more. However, if the Zr content exceeds 0.20%, Zr combines with Fe and the like to form an intermetallic compound, which deteriorates oxidation resistance. Thus, when the ferritic stainless steel foil includes Zr, the Zr content is preferably set to 0.01% to 0.20% and more preferably set to 0.01% to 0.05%.

Hf: 0.01% to 0.20%

Hf improves the adhesion between an $Al_2O_3$ coating layer and base iron and suppresses a reduction in the amount of solute Al. Thus, Hf has an effect of enhancing oxidation resistance at high temperatures. In order to obtain these effects, the Hf content is preferably set to 0.01% or more. However, the Hf content exceeding 0.20% promotes high-temperature oxidation, which results in degradation of oxidation resistance. Thus, the Hf content is preferably set to 0.01% to 0.20% and more preferably set to 0.02% to 0.10%.

Ca: 0.0010% to 0.0300%

Ca has a function of enhancing the adhesion of an $Al_2O_3$ coating layer. In order to obtain this effect, the Ca content is preferably set to 0.0010% or more. However, the Ca content exceeding 0.0300% deteriorates toughness and oxidation resistance at high temperatures. Thus, the Ca content is preferably set to 0.0010% to 0.0300% and more preferably set to 0.0020% to 0.0100%.

Mg: 0.0015% to 0.0300%

Mg has an effect of enhancing the adhesion between an $Al_2O_3$ coating layer and base iron similarly to Ca. In order to obtain this effect, the Mg content is preferably set to 0.0015% or more. However, the Mg content exceeding 0.0300% deteriorates toughness and oxidation resistance at high temperatures. Thus, the Mg content is preferably set to 0.0015% to 0.0300% and more preferably set to 0.0020% to 0.0100%.

2. Manufacturing Conditions

The above-described ferritic stainless steel foil can be manufactured in ordinary stainless steel manufacturing equipment. Steel having the above-described composition is refined in a converter, an electric furnace, or the like, and the molten steel is subjected to a secondary refining by VOD (vacuum oxygen decarburization) or AOD (argon oxygen decarburization). Subsequently, the refined steel is subjected to an ingot casting-slabbing process or a continuous casting process to produce a steel slab. The cast slab is placed in a heating furnace, heated to 1150° C. to 1250° C., and subsequently subjected to a hot-rolling process. The resulting hot-rolled steel strip is subjected to shot blasting, pickling, mechanical polishing, and the like to remove surface scale. Then, cold rolling and annealing are repeatedly performed a plurality of times to form stainless steel foil having a thickness of 100 μm or less. The thickness of the foil is preferably set to about 50 to 100 μm in the case where particularly high vibration resistance and high durability are required for the exhaust gas purifying facility. The thickness of the foil is preferably about 25 to 50 μm in the case where particularly high cell density and low back pressure are required for the exhaust gas purifying facility.

EXAMPLE 1

The present invention is described with reference to examples below. Steels having chemical compositions shown in Table 1, which had been refined by vacuum melting, were heated to 1200° C. and subsequently hot-rolled in the temperature range of 900° C. to 1200° C. to form hot-rolled steel sheets having a thickness of 3 mm. A strip-shaped test piece having a width of 25 mm and a length of 300 mm was cut from each of the hot-rolled steel sheets and subjected to a reverse bend test in order to evaluate threading performance of the hot-rolled sheet in the manufacturing line. In this test, bending work was repeated a plurality of times with a bend radius of 25 mm, simulating coiling of a hot-rolled sheet or bending that is occurred while a hot-rolled sheet passes through a pickling-annealing line. Then, a hot-rolled sheet capable of bearing bending work repeated ten times or more without rupturing was considered to have sufficiently high threading performance. Evaluation was conducted by the above-described method. Steel No. 1 to Steel No. 16 were capable of bearing work repeated ten times or more without rupturing and thus had good workability. However, Steel No. 17, in which the Al content exceeded the preferred range of the present invention, ruptured upon being bent for the third time, and the workability of the hot-rolled sheet was considered to be insufficiently low. Thus, Steel No. 17 was excluded from the following evaluation. Hot-rolled steel sheets prepared from Steel No. 1 to Steel No. 16 were annealed in the atmosphere at 1000° C. for 1 minute, pickled, and subsequently cold-rolled to form cold-rolled steel sheets having a thickness of 1.0 mm. The resulting cold-rolled steel sheets were annealed in the atmosphere at 950° C. to 1050° C. for 1 minute and subsequently pickled. Then, cold rolling using a cluster mill and annealing were repeatedly performed a plurality of times to prepare foils having a width of 100 mm and a thickness of 40 μm.

TABLE 1

| Steel No. | Composition (mass %) | | | | | | | | | | | | |
|---|---|---|---|---|---|---|---|---|---|---|---|---|---|
| | C | Si | Mn | P | S | Cr | Ni | Al | Cu | N | Nb | Ti | Zr |
| 1 | 0.005 | 0.09 | 0.15 | 0.026 | 0.0008 | 17.1 | 0.20 | 0.36 | 1.31 | 0.005 | — | — | — |
| 2 | 0.010 | 0.11 | 0.30 | 0.022 | 0.0009 | 12.3 | 0.17 | 0.32 | 1.38 | 0.009 | — | — | — |
| 3 | 0.006 | 0.10 | 0.28 | 0.023 | 0.0008 | 12.5 | 0.12 | 0.35 | 1.10 | 0.007 | 0.46 | — | — |
| 4 | 0.006 | 0.08 | 0.22 | 0.021 | 0.0016 | 24.1 | 0.24 | 0.06 | 1.04 | 0.007 | 0.47 | 0.19 | — |
| 5 | 0.008 | 0.07 | 0.28 | 0.023 | 0.0008 | 16.5 | 0.21 | 0.19 | 0.35 | 0.007 | 0.11 | — | 0.036 |
| 6 | 0.010 | 0.06 | 0.39 | 0.022 | 0.0007 | 16.7 | 0.18 | 0.64 | 0.21 | 0.008 | 0.57 | — | — |
| 7 | 0.007 | 0.06 | 0.18 | 0.025 | 0.0011 | 15.3 | 0.14 | 0.12 | 0.85 | 0.006 | 0.09 | — | — |
| 8 | 0.007 | 0.10 | 0.15 | 0.027 | 0.0012 | 17.2 | 0.20 | 0.46 | 1.24 | 0.005 | 0.41 | — | — |
| 9 | 0.009 | 0.10 | 0.11 | 0.020 | 0.0012 | 17.4 | 0.15 | 0.50 | 0.07 | 0.006 | 0.46 | — | — |
| 10 | 0.010 | 0.06 | 0.39 | 0.022 | 0.0010 | 16.7 | 0.18 | 0.36 | — | 0.008 | — | — | — |
| 11 | 0.007 | 0.06 | 0.18 | 0.025 | 0.0011 | 9.8 | 0.14 | 0.36 | 0.85 | 0.006 | — | — | — |
| 12 | 0.007 | 0.10 | 0.15 | 0.027 | 0.0013 | 16.8 | 0.20 | — | 1.24 | 0.005 | — | — | — |
| 13 | 0.008 | 0.15 | 0.15 | 0.021 | 0.0008 | 17.1 | 0.18 | 0.35 | 0.02 | 0.006 | — | 0.18 | — |
| 14 | 0.008 | 1.5 | 0.16 | 0.022 | 0.0008 | 11.2 | 0.19 | 0.35 | 0.87 | 0.006 | — | 0.21 | — |
| 15 | 0.009 | 0.12 | 0.16 | 0.023 | 0.0009 | 17.3 | 0.19 | 0.02 | 1.33 | 0.006 | — | 0.22 | — |
| 16 | 0.007 | 0.11 | 0.17 | 0.025 | 0.0009 | 17.2 | 0.18 | 0.35 | 2.98 | 0.006 | 0.45 | — | — |
| 17 | 0.009 | 0.09 | 0.15 | 0.026 | 0.0009 | 17.1 | 0.16 | 2.30 | 1.13 | 0.006 | 0.42 | — | — |

| Steel No. | Composition (mass %) | | | | | | | | |
|---|---|---|---|---|---|---|---|---|---|
| | REM | | | W | Mo | Hf | Ca | Mg | Remarks |
| | La | Y | Sm | | | | | | |
| 1 | — | — | — | — | — | — | 0.0015 | 0.0025 | Invention Example |
| 2 | — | — | — | — | — | — | 0.0025 | 0.0015 | Invention Example |
| 3 | — | — | — | — | — | — | 0.0022 | 0.0013 | Invention Example |
| 4 | — | — | — | — | — | — | 0.0023 | 0.0025 | Invention Example |
| 5 | — | — | — | — | — | — | 0.0022 | 0.0023 | Invention Example |
| 6 | — | — | — | — | 2.1 | — | 0.0030 | 0.0030 | Invention Example |
| 7 | 0.069 | — | — | — | 2.0 | — | 0.0027 | 0.0017 | Invention Example |
| 8 | 0.075 | — | — | 2.1 | — | 0.034 | 0.0016 | 0.0028 | Invention Example |
| 9 | — | 0.050 | 0.030 | 1.0 | 1.0 | 0.034 | 0.0028 | 0.0023 | Invention Example |
| 10 | — | — | — | — | — | — | 0.0030 | 0.0030 | Comparative Example |
| 11 | — | — | — | — | — | — | 0.0027 | 0.0017 | Comparative Example |
| 12 | — | — | — | — | — | — | 0.0016 | 0.0028 | Comparative Example |
| 13 | — | — | — | — | — | — | — | — | Invention Example |
| 14 | — | — | — | — | — | — | — | — | Invention Example |
| 15 | — | — | — | — | — | — | — | — | Invention Example |
| 16 | — | — | — | — | — | — | — | — | Comparative Example |
| 17 | — | — | — | — | — | — | — | — | Comparative Example |

Note:
underlined values are out of the range of the present invention

The cold-rolled steel sheets and foils prepared as described above were evaluated by the following method in terms of strength (rupture stress) at high temperatures, resistance to shape change, resistance to peeling of a coating layer, and oxidation resistance at high temperatures.

(1) Strength at High Temperatures

Figure 2:
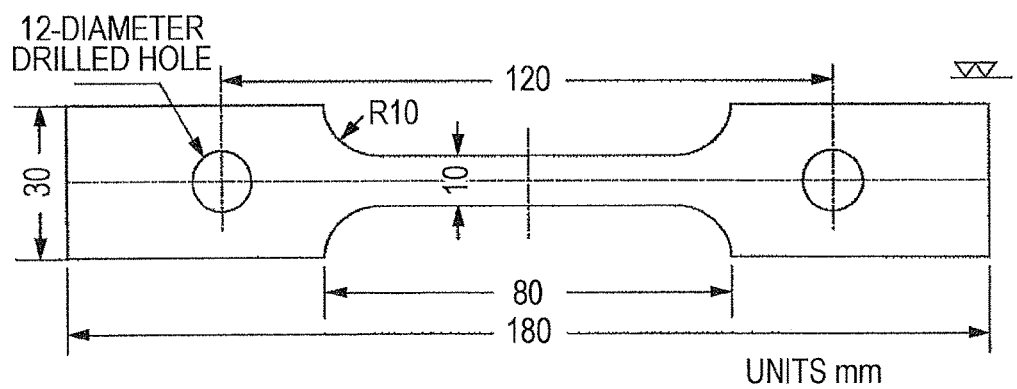
FIG. 2 is a diagram illustrating the shape of a high-temperature tensile test piece.

The cold-rolled steel sheets having a thickness of 1 mm were subjected to a heat treatment at 1200° C. for 30 minutes in a vacuum of $4\times10^{-5}$ Torr ($5.3\times10^{-3}$ Pa) or less, simulating a heat treatment performed in diffusion bonding or brazing of contact portions between a corrugated sheet and a flat sheet. Then, a test piece shown in FIG. 2 was cut from each of the heat-treated cold-rolled steel sheets and subjected to a high-temperature tensile test at 800° C. to measure the 0.2% proof stress of the test piece. The speed of tensile testing was initially set to 0.2 mm/min and then changed to 5 mm/min upon the proof stress being exceeded. The results of measurement of 0.2% proof stress were evaluated as "X: Poor" when the 0.2% proof stress was less than 15 MPa, evaluated as "○: Good" when the 0.2% proof stress was 15 MPa or more and less than 35 MPa, and evaluated as "◎: Excellent" when the 0.2% proof stress was 35 MPa or more. The evaluations of "○: Good" and "◎: Excellent" were considered to satisfy the purpose of the present invention.

(2) Resistance to Shape Change at High Temperatures

The foils having a thickness of 40 μm were subjected to a heat treatment at 1200° C. for 30 minutes, which is equivalent to a heat treatment performed in diffusion bonding or brazing, in a vacuum of $4 \times 10^{-5}$ Torr ($5.3 \times 10^{-3}$ Pa) or less. A test piece having a width of 100 mm and a length of 50 mm was cut from each of the heat-treated foils, and the test piece was wound into a cylindrical shape having a diameter of 5 mm in the longitudinal direction of the test piece. The edges of the resulting test piece were fixed in place by spot welding. Three test pieces described above were prepared from each of the foils. The test pieces were heated at 1150° C. for 400 hours in an air atmosphere furnace, and the average of changes in the dimensions of the three test pieces (the ratio of an increment of the length of the cylinder that occurred during heating to the length of the cylinder before heating) was determined. The results of measurement of average dimensional change were evaluated as "X: Poor" when the average dimensional change exceeded 5%, evaluated as "○: Good" when the average dimensional change was more than 3% and 5% or less, and evaluated as "◎: Excellent" when the average dimensional change was 3% or less. The evaluations of "○: Good" and "◎: Excellent" were considered to satisfy the purpose of the present invention.

(3) Resistance to Peeling of Coating Layer at High Temperatures

The foils having a thickness of 40 μm were subjected to a heat treatment at 1200° C. for 30 minutes, which is equivalent to a heat treatment performed in diffusion bonding or brazing, in a vacuum of $4 \times 10^{-5}$ Torr ($5.3 \times 10^{-3}$ Pa) or less. Three test pieces having a width of 20 mm and a length of 30 mm were taken from each of the heat-treated foils. A cycle of (maintaining at 800° C. for 20 min and subsequently cooling to 200° C. or less) was repeated 300 times in an air atmosphere furnace. The test pieces that had been subjected to the test were visually inspected, and the ratio of the area of scale-peeling portion to the area of the inspected portion (peeling area/inspected area×100) was determined. The evaluation of "X: Poor" was given when the measurement result was more than 3%. The evaluation of "○: Good" was given when the measurement result was more than 1% and 3% or less. The evaluation of "◎: Excellent" was given when the measurement result was 1% or less and peeling was hardly observed. The evaluations of "○: Good" and "◎: Excellent" were considered to satisfy the purpose of the present invention.

(4) Oxidation Resistance at High Temperatures

The foils having a thickness of 40 μm were subjected to a heat treatment at 1200° C. for 30 minutes, which is equivalent to a heat treatment performed in diffusion bonding or brazing, in a vacuum of $4 \times 10^{-5}$ Torr ($5.3 \times 10^{-3}$ Pa) or less. Three test pieces having a width of 20 mm and a length of 30 mm were taken from each of the heat-treated foils. The test pieces were heated at 800° C. for 400 hours in an air atmosphere furnace, and the average of increases in the weights of the three test pieces due to oxidation (a quotient obtained by dividing a change in the weight that occurred during heating by the initial surface area) was determined. Scale peeled from a test piece after heating was collected, and the weight of the scale was added to the increase in the weight of the test piece due to oxidation. The results of the measurement of average weight increment due to oxidation were evaluated as "Poor" when the average weight increment was more than 10 g/m², evaluated as "○: Good" when the average weight increment was more than 5 g/m² and 10 g/m² or less, and evaluated as "◎: Excellent" when the average weight increment was 5 g/m² or less. The evaluations of "○: Good" and "◎: Excellent" were considered to satisfy the purpose of the present invention.

Table 2 shows the results.

TABLE 2

| Steel No. | Strength at high temperatures | | Resistance to shape change at high temperatures | | Resistance to peeling of coating layer at high temperatures | | Oxidation resistance at high temperatures | | Remarks |
|---|---|---|---|---|---|---|---|---|---|
| | 0.2% proof stress (MPa) | Evaluation | Shape change (%) | Evaluation | Peeling ratio (%) | Evaluation | Weight increment due to oxidation (g/m²) | Evaluation | |
| 1 | 36 | ◎: Excellent | 0.9 | ◎: Excellent | <0.1 | ◎: Excellent | 3.5 | ◎: Excellent | Invention Example |
| 2 | 28 | ○: Good | 3.2 | ○: Good | <0.1 | ◎: Excellent | 4.1 | ◎: Excellent | Invention Example |
| 3 | 35 | ◎: Excellent | 0.8 | ◎: Excellent | <0.1 | ◎: Excellent | 3.2 | ◎: Excellent | Invention Example |
| 4 | 47 | ◎: Excellent | 0.3 | ◎: Excellent | <0.1 | ◎: Excellent | 4.8 | ◎: Excellent | Invention Example |
| 5 | 34 | ○: Good | 4.6 | ○: Good | <0.1 | ◎: Excellent | 5.2 | ○: Good | Invention Example |
| 6 | 51 | ◎: Excellent | 0.3 | ◎: Excellent | <0.1 | ◎: Excellent | 1.2 | ◎: Excellent | Invention Example |
| 7 | 29 | ○: Good | 3.4 | ○: Good | <0.1 | ◎: Excellent | 3.5 | ◎: Excellent | Invention Example |
| 8 | 53 | ◎: Excellent | 0.7 | ◎: Excellent | <0.1 | ◎: Excellent | 1.2 | ◎: Excellent | Invention Example |
| 9 | 57 | ◎: Excellent | 0.6 | ◎: Excellent | <0.1 | ◎: Excellent | 1.4 | ◎: Excellent | Invention Example |
| 10 | 13 | X: Poor | 7.8 | X: Poor | 1.5 | ○: Good | 7.2 | ○: Good | Comparative Example |
| 11 | 13 | X: Poor | 12.3 | X: Poor | 7.1 | X: Poor | 34 | X: Poor | Comparative Example |
| 12 | 28 | ○: Good | 3.6 | ○: Good | 6.4 | X: Poor | 13 | X: Poor | Comparative Example |
| 13 | 20 | ○: Good | 4.7 | ○: Good | <0.1 | ◎: Excellent | 4.7 | ◎: Excellent | Invention Example |
| 14 | 34 | ○: Good | 3.5 | ○: Good | <0.1 | ◎: Excellent | 2.8 | ◎: Excellent | Invention Example |

TABLE 2-continued

| | Strength at high temperatures | | Resistance to shape change at high temperatures | | Resistance to peeling of coating layer at high temperatures | | Oxidation resistance at high temperatures | | |
|---|---|---|---|---|---|---|---|---|---|
| Steel No. | 0.2% proof stress (MPa) | Evaluation | Shape change (%) | Evaluation | Peeling ratio (%) | Evaluation | Weight increment due to oxidation (g/m$^2$) | Evaluation | Remarks |
| 15 | 37 | ⊚: Excellent | 0.8 | ⊚: Excellent | <0.1 | ⊚: Excellent | 8.3 | ○: Good | Invention Example |
| 16 | 38 | ⊚: Excellent | 0.7 | ⊚: Excellent | 1.8 | ○: Good | 19 | X: Poor | Comparative Example |
| 17 | | | | | Not evaluated | | | | Comparative Example |

Steel No. 1 to Steel No. 9 and Steel No. 13 to Steel No. 15, which were Invention Examples, had high strength and high resistance to shape change at high temperatures and also had high resistance to peeling of a coating layer and high oxidation resistance at high temperatures. In addition, since they also have high toughness, these steels were capable of being produced with efficiency in ordinary stainless steel production equipment. On the other hand, Steel No. 10 to Steel No. 12 and Steel No. 16, which were Comparative Examples, were poor in terms of at least one characteristic among strength, resistance to shape change, resistance to peeling of a coating layer, and oxidation resistance at high temperatures and therefore are not suitably used as a catalyst carrier.

According to the present invention, stainless steel foil that is suitably used for forming a catalyst carrier for an exhaust gas purifying facility, the catalyst carrier being used at a relatively low temperature such that the highest temperature reached by exhaust gas is about 800° C. or less can be produced with efficiency in ordinary stainless steel production equipment, which is very effective industrially.

REFERENCE SIGNS LIST

1 flat foil
2 corrugated foil
3 external cylinder
4 metal honeycomb

The invention claimed is:

1. Ferritic stainless steel foil containing, by mass %, C: 0.02% or less, Si: 0.15% or less, Mn: 0.5% or less, S: 0.005% or less, P: 0.05% or less, Cr: 11.0% to 25.0%, Ni: 0.05% to 0.30%, Al: 0.32% to 1.0%, Cu: 0.01% to 2.0%, N: 0.10% or less, and the balance being Fe and inevitable impurities.

2. The ferritic stainless steel foil according to claim 1 further containing, by mass %, one or more elements selected from Nb: 0.01% to 1.0%, Mo: 0.01% to 3.0%, and W: 0.01% to 3.0%, the content of the one or more elements being 0.01% to 3.0% in total.

3. The ferritic stainless steel foil according to claim 1 further containing, by mass %, REM: 0.01% to 0.20%.

4. The ferritic stainless steel foil according to claim 1 further containing, by mass %, one or more elements selected from Ti: 0.01% to 1.0%, Zr: 0.01% to 0.20%, Hf: 0.01% to 0.20%, Ca: 0.0010% to 0.0300%, and Mg: 0.0015% to 0.0300%.

5. The ferritic stainless steel foil according to claim 1 having a thickness of 100 μm or less.

6. The ferritic stainless steel foil according to claim 2 further containing, by mass %, REM: 0.01% to 0.20%.

7. The ferritic stainless steel foil according to claim 2 further containing, by mass %, one or more elements selected from Ti: 0.01% to 1.0%, Zr: 0.01% to 0.20%, Hf: 0.01% to 0.20%, Ca: 0.0010% to 0.0300%, and Mg: 0.0015% to 0.0300%.

8. The ferritic stainless steel foil according to claim 3 further containing, by mass %, one or more elements selected from Ti: 0.01% to 1.0%, Zr: 0.01% to 0.20%, Hf: 0.01% to 0.20%, Ca: 0.0010% to 0.0300%, and Mg: 0.0015% to 0.0300%.

9. The ferritic stainless steel foil according to claim 2 having a thickness of 100 μm or less.

10. The ferritic stainless steel foil according to claim 3 having a thickness of 100 μm or less.

11. The ferritic stainless steel foil according to claim 4 having a thickness of 100 μm or less.

12. The ferritic stainless steel foil according to claim 6 further containing, by mass %, one or more elements selected from Ti: 0.01% to 1.0%, Zr: 0.01% to 0.20%, Hf: 0.01% to 0.20%, Ca: 0.0010% to 0.0300%, and Mg: 0.0015% to 0.0300%.

13. The ferritic stainless steel foil according to claim 6 having a thickness of 100 μm or less.

14. The ferritic stainless steel foil according to claim 7 having a thickness of 100 μm or less.

15. The ferritic stainless steel foil according to claim 8 having a thickness of 100 μm or less.

16. The ferritic stainless steel foil according to claim 12 having a thickness of 100 μm or less.

* * * * *